(12) United States Patent
Liao et al.

(10) Patent No.: US 9,984,580 B2
(45) Date of Patent: May 29, 2018

(54) METHOD AND SYSTEM FOR ROBUST NETWORK PLANNING OPTIMIZATION OF AIRLINE FLIGHT OPERATIONS

(71) Applicant: General Electric Company, Schenectady, NY (US)

(72) Inventors: Hongwei Liao, Niskayuna, NY (US); James Kenneth Aragones, Clifton Park, NY (US); Nitika Bhaskar, Bangalore (IN); Jonathan Mark Dunsdon, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days. days.

(21) Appl. No.: 14/593,578

(22) Filed: Jan. 9, 2015

(65) Prior Publication Data

US 2016/0203722 A1    Jul. 14, 2016

(51) Int. Cl.
G08G 5/00 (2006.01)
G06Q 10/04 (2012.01)
G06Q 10/06 (2012.01)
G06Q 50/30 (2012.01)

(52) U.S. Cl.
CPC ........... G08G 5/0095 (2013.01); G06Q 10/04 (2013.01); G06Q 10/0631 (2013.01); G06Q 50/30 (2013.01); G08G 5/0017 (2013.01); G08G 5/0039 (2013.01); G08G 5/0043 (2013.01)

(58) Field of Classification Search
CPC ........................... G08G 5/0004; G08G 5/0017
See application file for complete search history.

(56) References Cited

U.S. PATENT DOCUMENTS

| | | | |
|---|---|---|---|
| 6,134,500 A | 10/2000 | Tang et al. | |
| 6,314,361 B1 | 11/2001 | Yu et al. | |
| 7,085,726 B1 * | 8/2006 | Galperin | G06Q 10/02 705/5 |
| 7,340,405 B1 | 3/2008 | Guenther et al. | |
| 7,668,744 B2 | 2/2010 | Tiourine et al. | |
| 7,725,337 B2 | 5/2010 | Chu et al. | |
| 7,848,944 B1 | 12/2010 | Anbil | |
| 8,050,936 B1 | 11/2011 | Jamotta et al. | |

(Continued)

FOREIGN PATENT DOCUMENTS

| | | |
|---|---|---|
| CN | 101582203 A | 11/2009 |
| EP | 1258823 A2 | 11/2002 |

(Continued)

OTHER PUBLICATIONS

Chiraphadhanakul et al., "Robust flight schedules through slack re-allocation". AGIFORS 51st Annual Symposium, 2011.

(Continued)

*Primary Examiner* — Jonathan M Dager
*Assistant Examiner* — Garrett F Evans
(74) *Attorney, Agent, or Firm* — Nitin N. Joshi (57) ABSTRACT

A method, medium, and system to receive a baseline airline schedule including details associated with at least one flight; optimize the baseline airline schedule in accordance with at least one specified optimization objective to generate an optimized airline schedule; evaluate a robustness of the optimized airline schedule based on an execution of a simulation based process to generate a set of quantitative metrics; and generate a record of the set of quantitative metrics.

19 Claims, 4 Drawing Sheets

(56) References Cited

U.S. PATENT DOCUMENTS

| | | | |
|---|---|---|---|
| 8,117,007 | B2 | 2/2012 | Yitbarek et al. |
| 8,340,854 | B2 | 12/2012 | Doulatshahi et al. |
| 8,554,457 | B2 | 10/2013 | White et al. |
| 8,594,917 | B2 | 11/2013 | Sawhill et al. |
| 8,744,902 | B2 | 6/2014 | Nguyen et al. |
| 2003/0004780 | A1* | 1/2003 | Smith ............ G06Q 10/06 705/14.5 |
| 2005/0065842 | A1 | 3/2005 | Summers |
| 2005/0071206 | A1 | 3/2005 | Berg |
| 2007/0214033 | A1 | 9/2007 | Miller |
| 2007/0219833 | A1 | 9/2007 | Trautman |
| 2009/0157438 | A1* | 6/2009 | Chu ............... G06Q 10/02 705/6 |
| 2009/0276250 | A1 | 11/2009 | King et al. |
| 2011/0246000 | A1 | 10/2011 | Shavit |
| 2012/0053916 | A1 | 3/2012 | Tzidon |
| 2013/0138332 | A1 | 5/2013 | Johnson et al. |
| 2013/0226373 | A1 | 8/2013 | Bollapragada et al. |
| 2014/0081569 | A1 | 3/2014 | Agrawal et al. |
| 2014/0257900 | A1* | 9/2014 | Jacobs ........ G06Q 10/063116 705/7.16 |

FOREIGN PATENT DOCUMENTS

| | | | |
|---|---|---|---|
| JP | H08-61974 | A | 3/1996 |
| JP | H11-306480 | A | 11/1999 |
| JP | 2001-307300 | A | 11/2001 |
| JP | 2002329158 | A | 11/2002 |
| JP | 2009527857 | A | 7/2009 |
| JP | 2011170502 | A | 9/2011 |
| JP | 2013186717 | A | 9/2013 |
| JP | 2014029661 | A | 2/2014 |
| JP | 2014041475 | A | 3/2014 |

OTHER PUBLICATIONS

Lan et al., "Planning for Robust Airline Operations: Optimizing Aircraft Routings and Flight Departure Times to Minimize Passenger Disruptions", Transportation Science, vol. 40, No. 1, pp. 15-28, Feb. 2006.

Reiners, Torsten et al., "Integrated Aircraft Scheduling Problem: An Auto-Adapting Algorithm to Find Robust Aircraft Assignments for Large Flight Plans", 2012 45th Hawaii International Conference on System Sciences (HICSS) on IEEE Xplore, Jan. 4-7, 2012, DOI: 10.1109/HICSS.2012.330, (pp. 1267-1276, 10 total pages).

Ageeva et al., "MIT ICAT Approaches to Incorporating Robustness Into Airline Scheduling" MIT International Center for Air Transportation, Department of Aeronautics & Astronautics, pp. 1-94, Aug. 31, 2000.

Weide et al., "An Iterative Approach to Robust and Integrated Aircraft Routing and Crew Scheduling", Computer & Operations Research, vol. No. 37, Issue No. 5, pp. 833-844, May 1, 2010.

European Search Report and Opinion issued in connection with corresponding EP Application No. 16150605.0 dated Jun. 3, 2016.

GE Related Case Form.

Haerne et al., "Airline Performance Modelling to Support Schedule Development: An Application Case Study", Proceedings of the 1988 Winter Simulation Conference, pp. 800-806, Dec. 12, 1988.

Wieland et al., "Parallel Simulation for Aviation Applications", Proceedings of the 1998 Winter Simulation Conference, vol. No. 02, pp. 1191-1198, Dec. 13, 1998.

European Search Report and Opinion issued in connection with Related EP Application No. 15200057.6 dated Apr. 14, 2016.

European Search Report and Opinion issued in connection with Related EP Application No. 15198758.3 dated Apr. 26, 2016.

Unofficial English Translation of Japanese Search Report issued in connection with Corresponding Jp Application No. 2015252724 on Dec. 15, 2016.

Unofficial English Translation of Japanese Office Action issued in connection with Corresponding Jp Application No. 2015252724 on Jan. 17, 2017.

Japanese Search Report issued in connection with related JP Application No. 2015-245792 dated Feb. 24, 2017.

Notification of Reasons for Refusal issued in connection with related JP Application No. 2015-245792 dated Mar. 21, 2017.

Non-Final Rejection towards related U.S. Appl. No. 14/582,523 dated Apr. 20, 2017.

Liao, et al., filed Dec. 24, 2014, U.S. Appl. No. 14/582,523.

Liao, et al., filed Dec. 24, 2014, U.S. Appl. No. 14/582,602.

* cited by examiner

METHOD AND SYSTEM FOR ROBUST NETWORK PLANNING OPTIMIZATION OF AIRLINE FLIGHT OPERATIONS

BACKGROUND

Airline traffic network planning may typically happen many months in advance of an anticipated usage of an airline schedule produced by such planning. On the other hand, an evaluation of a robustness of an airline schedule is typically done near the actual execution of the schedule (i.e., near or on the day of the flights comprising the schedule). In some regards, an airline may not know how robust their flight schedule is, or they may not know how to quantify and evaluate the robustness of flight schedule. The robustness of the flight schedule may only become known to them after the schedule has been operated (i.e., after it has been flown).

Given the drastically different timelines for optimizing an airline schedule and for evaluating aspects thereof, these two processes are typically isolated from one another, even though aspects of each process may be of interest to an airline or other entity.

Therefore, it would be desirable to design an apparatus and method that provides for an integration of schedule planning optimization and robustness evaluation for an airline.

SUMMARY

According to some embodiments, a method and system is disclosed that provides airline traffic network planning and an evaluation of the robustness of plans optimized thereby. The system includes an optimization module to optimize an input or baseline airline schedule and a robustness analysis module to evaluate a robustness of the optimized airline schedule. The optimization module and the robustness analysis module may be configured in a "closed-loop" feedback system that reflects a decision life cycle of an airline network planning process.

A technical effect of some embodiments of the present disclosure is an efficient technique and system for providing robust network planning optimization for commercial airline flight operations, including optimizing utilization of airline assets while also incorporating recovery planning factors and considering robustness objectives. With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DETAILED DESCRIPTION

The following description is provided to enable any person in the art to make and use the described embodiments. Various modifications, however, will remain readily apparent to those in the art.

Figure 1:
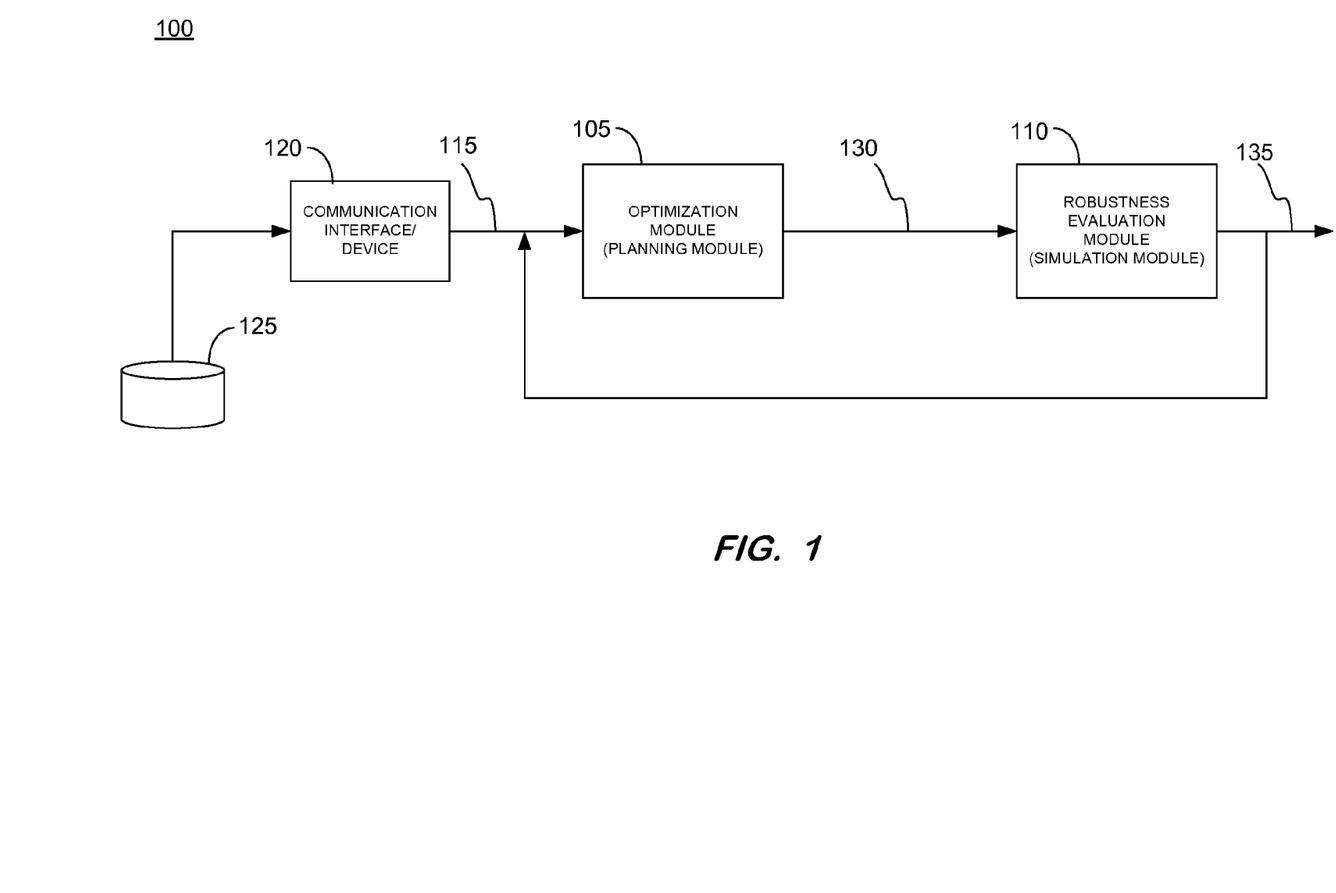
FIG. 1 is an illustrative depiction of a system, according to some embodiments.

FIG. 1 is a block diagram of a robust network planning optimization system 100 for commercial airline flight operations, according to some embodiments. System 100 includes two main components, an optimization module 105 and a robustness analysis module 110. Optimization module 105 may primarily provide a mechanism to optimize an airline schedule based on one or more objectives of an airline or other entity. Optimization module 105 receives, as an input, a first or baseline airline schedule 115. Baseline airline schedule 115 may be transmitted to optimization module 105 from another device or system. In some aspects, baseline airline schedule 115 may be received by optimization module 105 from a database 125. Database 125 may be maintained, owned, or controlled by an airline, a government agency (e.g., an aviation regulatory agency), or a third-party service provider. In some instances, communication of the baseline airline schedule 115 from database 125 to optimization module 105 may be facilitated by communication device or interface 120. In some aspects, communication device 120 may be part of a system, sub-system, or device comprising optimization module 105, whereas it may be independent of optimization module 105 in some other embodiments. Optimization module 105 may operate to optimize baseline airline schedule 115 based on one or more predefined objectives. An output 130 of optimization module 105 may include a representation of an optimized airline schedule determined based, at least in part, on the one or more predefined objectives considered in calculating the optimized airline schedule. In some aspects, optimization module 105 may also be referred to as a "planning" module herein.

In some aspects, the first or baseline airline schedule 115 input to optimization module 105 may include details associated with each of the at least one flight comprising the baseline airline schedule. In some aspects, the details associated with the at least one flight include at least one of a flight number, a flight departure time, a flight arrival time, a flight departure airport, a flight arrival airport, an aircraft type for the at least one flight, flight crew details for the at least one flight, other specific information related to the flight including but not limited to desired city pairs, desired flight times, block times, aircraft assets, airports, airport gate assignments, ground crews, and flight crews, and combinations thereof. These types of details including a subset thereof may be included for each flight in the baseline airline schedule. As an example, a baseline airline schedule for a particular airline may include about 3,000 flights per day. Accordingly, the baseline airline schedule may be complex and well-suited for being developed, stored, and managed by a database system 125. Database system 125 may comprise a relational database, a multi-dimensional database, an eXtendable Markup Language (XML) document, or any other data storage system storing structured and/or unstructured data. Database system 125 may comprise a distributed database system having data thereof distributed among several relational databases, multi-dimensional databases, and/or other data sources, an object oriented database, a hybrid database, and other types of database management systems including an in-memory database system that can be provided in the "cloud" and as a service, without limit or loss of generality.

In some aspects herein, optimization module 105 may use one or more algorithms to process the baseline airline schedule 115 to generate, calculate, or otherwise determine the optimized airline schedule 130. In some embodiments, optimization module 105 may perform or execute the optimization of the airline schedule input thereto (e.g., baseline airline schedule 115) using at least one algorithm from a suite of algorithms. The suite of algorithms may include any algorithms or techniques that are now known or that become known which are applicable for the processing and determining of optimized airline schedules. In some embodiments, the suite of algorithms may include at least one of a connection-based algorithm, a string-based algorithm, other algorithms using linear integer programming, an artificial intelligence algorithm, and other heuristics-based algorithms, where the particular optimization algorithm executed by optimization module 105 can depend on a user specified selection or preference, a complexity of the optimization being performed, and combinations thereof. In some aspects, the selection of the particular algorithm to use in optimizing an airline schedule by optimization module 105 may be accomplished automatically by a device, system, or apparatus implementing the module.

In one example herein, a connection-based optimization model or algorithm that minimizes the total number of aircrafts needed to operate a given schedule may be used by optimization module 105. The connection-based model may consider four main factors or constraints that include guaranteeing the traffic frequency of all city pairs in the schedule will be maintained in the output schedule, guaranteeing an aircraft flow balance at each station (i.e., balance inbound flights and outbound flights at each station), balancing aircraft flow across days (e.g., current day to overnight and overnight to current day), and aircraft capacity. The model can also incorporate additional constraints, such as airport flow restriction, curfew, aircraft turn time, crew turn time, passenger connection time, etc.

In some aspects, the optimization performed by optimization module 105 is executed in accordance with one or more specified objectives. The objective(s) may be provided by a user (e.g., optimization administrator) or other entity (e.g., airline, governing agency, etc.). In some embodiments, the objective(s) may include and consider one or more of a revenue plan, traffic intensity, traffic pattern(s), aircraft turn times, airport flow rates, and disruption recovery opportunity. As an example, objectives for an optimization by optimization module 105 may include minimizing costs (including minimizing fuel costs, crew costs, etc.) to achieve the planned schedule, maximizing utilization of aircraft, and maximizing robustness of the schedule, either alone or in combination. Additional and/or other objectives may be used to optimize a particular airline schedule but factors thereof may also be considered and applied by optimization module 105. As referred to herein, an operation disruption recovery opportunity may be generally characterized by three key attributes. Namely, the attributes of duration of aircraft turn, time of day of aircraft turn, and location of aircraft turn. These three attributes may be built into the optimization module through the cost/reward functions for aircraft turns and flight connectivity. Also, recovery opportunity may be characterized by the number of spare aircrafts in the system. In some aspects, one embodiment of the present disclosure may distribute spare aircraft across the network following the cost/reward objectives mentioned above so as to create recovery opportunity. In another aspect, another aspect: recovery opportunity and schedule robustness may be characterized by extra buffer time in aircraft turns and/or crew turns, which can be built into the model constraints and/or cost/reward objectives mentioned above.

Based on the algorithm(s) and the specified objective(s) used by optimization module 105, the output 130 thereof provides solutions for flight scheduling and aircraft routing, which is optimized to achieve the specified objective(s). The output of the optimization module is used as an input to robustness analysis module 110.

Robustness analysis module 110 may primarily execute or perform a process to evaluate a robustness of the optimized airline schedule 130 output by optimization module 105. In some aspects, the robustness analysis uses a simulation of airline operations (i.e., a "virtual airline") to evaluate the robustness of optimized schedule 130. In some aspects, robustness analysis module 110 may also be referred to as a "simulation" module herein.

In some aspects herein, robustness analysis module 110 conducts root cause analysis of airline operation disturbances. As used herein, an airline operation disturbance may be any event, occurrence, or scenario that impacts the actual execution of the schedule to cause a deviation from the schedule. The airline operation disturbance may occur on a day of or day before (i.e., proximate, near, or on) the operation of a flight. Some examples of airline operation disturbances include, but are not limited to, weather related delays, passenger connection delays, flight crew related delays, airport related delays, aircraft related delays, and other factors. Additionally, airline operation disturbances may comprise root cause(s) (e.g., a snow storm at an airline hub airport) and propagation delay cause(s) (e.g., a connecting flight delayed at an east coast airport due to a snow storm at the airline's midwest hub airport).

In accordance with some aspects herein, robustness analysis module 110 may be operable to determine and use the root cause(s) of airline operation disturbances. In some embodiments, robustness analysis module 110 may be operable to at least consider and process the root cause(s) of airline operation disturbances that may be provided thereto for processing.

Robustness analysis module 110 may be operable to further evaluate robustness metrics of the flight plan 130 generated by optimization module 105. In accordance with some embodiments herein, the robustness evaluation of module 110 is conducted by simulation-based method or process, with the identified disturbance root cause(s) injected into the simulation. In some aspects, the identified disturbance root cause(s) may represent some real disturbance experienced by the airline network on some historical day(s) of operation that corresponds to the reference schedule where the root causes are extracted. In another example, users may inject hypothetical disturbances into the simulation, which represent some typical disturbance scenarios, for the purpose of benchmark testing and/or stress testing of the schedule robustness. As used herein, robustness of an airline schedule refers to how fragile a schedule is (or is not) to an airline operation disturbance. The more robust a schedule, the more capacity the schedule has to absorb airline operation disturbances without deviating from the planned airline schedule (e.g., optimized schedule 130).

Regarding the simulation-based method to evaluate the robustness, it is noted that embodiments herein may use an airline operations simulation that models a very detailed operation of the flights comprising the airline. For example, details of the flights may include all aspects of a flight, including but not limited to, departure gate, taxi out, takeoff, cruising, landing, taxi in, arrival gate, airport traffic control, curfew, cockpit crews, cabin crews, ground crews, passengers in different service classes, and other aspects of the flight. Accordingly, the simulation may be referred to as a modeling of a virtual airline.

In some aspects, a set of robustness key performance indices (KPIs) are generated from the robustness evaluation. An output of robustness analysis module 110 may include a set of quantitative measures or metrics 140. Quantitative metrics 140 may provide an indication or representation of a value of the robustness of the particular optimized schedule evaluated by robustness analysis module 110. The indication or representation of the value of the robustness of an optimized schedule may be expressed in terms of one or more KPIs 140. The KPIs may represent factors and considerations an airline (or other entity) values as important, insightful, or key indicators of performance of an airline schedule. In some aspects, the value of the representation of the robustness may include a scaled, a relative ranking, a normalized value, and other value formats. The KPIs may characterize the airline's performance related to on-time departure, on-time arrival, flight delays, flight cancellations, passenger satisfaction, cargo, revenue, and cost.

As shown in FIG. 1, optimization module 105 and robustness analysis module 110 may be configured in a closed-loop feedback arrangement where an output of optimization module 105 is an input to robustness analysis module 110. Furthermore, an output of the robustness analysis module may be fed back into the optimization module in an instance the result 135 of the robustness evaluation does not satisfy or at least meet (i.e., equal) a desired, specified threshold value for the KPIs. The output of robustness analysis module 110 provides feedback to optimization module 105 and the optimization process thereof may be re-determined or recalculated using optimization module parameters updated to generate a new optimized schedule that will hopefully achieve satisfactory KPI values when it is evaluated by robustness analysis module 110 in the closed-loop system of FIG. 1. In an instance the output of the robustness analysis module satisfies the KPI threshold(s) 140, then no further optimization and evaluation may be performed, and a record or other reporting of the KPI values obtained and/or newly optimized schedule may be generated. The generated record or report may be saved to a file, transmitted in a message to a system or device (not shown in FIG. 1), and provided to a user or other entity. However, in an instance the output of the robustness analysis module 110 does not satisfy the KPI threshold(s) 140, then further optimizations and evaluations may be iteratively performed until the KPI threshold(s) are satisfied.

In some embodiments, the iterative process performed by system 100 including optimizing an airline schedule and evaluating the robustness thereof using a simulation-based method may be iteratively performed on a schedule that does have satisfactory or acceptable KPI values. In some such cases, the iterative process may be repeated with the robustness evaluation results 135 being fed back to the optimization module, thereby providing guidance for a new iteration of the optimization process with updated parameter settings. In some aspects, parameters considered by the optimization model may be tuned in an effort to achieve the desired KPIs. In some embodiments, system 100 terminates and outputs the final optimized airline scheduling plan when optimization process 105 generates a flight plan that satisfies the robustness requirements as set by a user (or other entity) and evaluated by the robustness analysis module 110. A record and/or a report including at least one of the final optimized schedule and the KPI values for the final optimized plan may be generated, stored, and transmitted to other devices (e.g., a display), systems (e.g., a database management system or other data persistence), and services (e.g., a cloud based data visualization service used by airline administrators within an airline organization).

Figure 2:
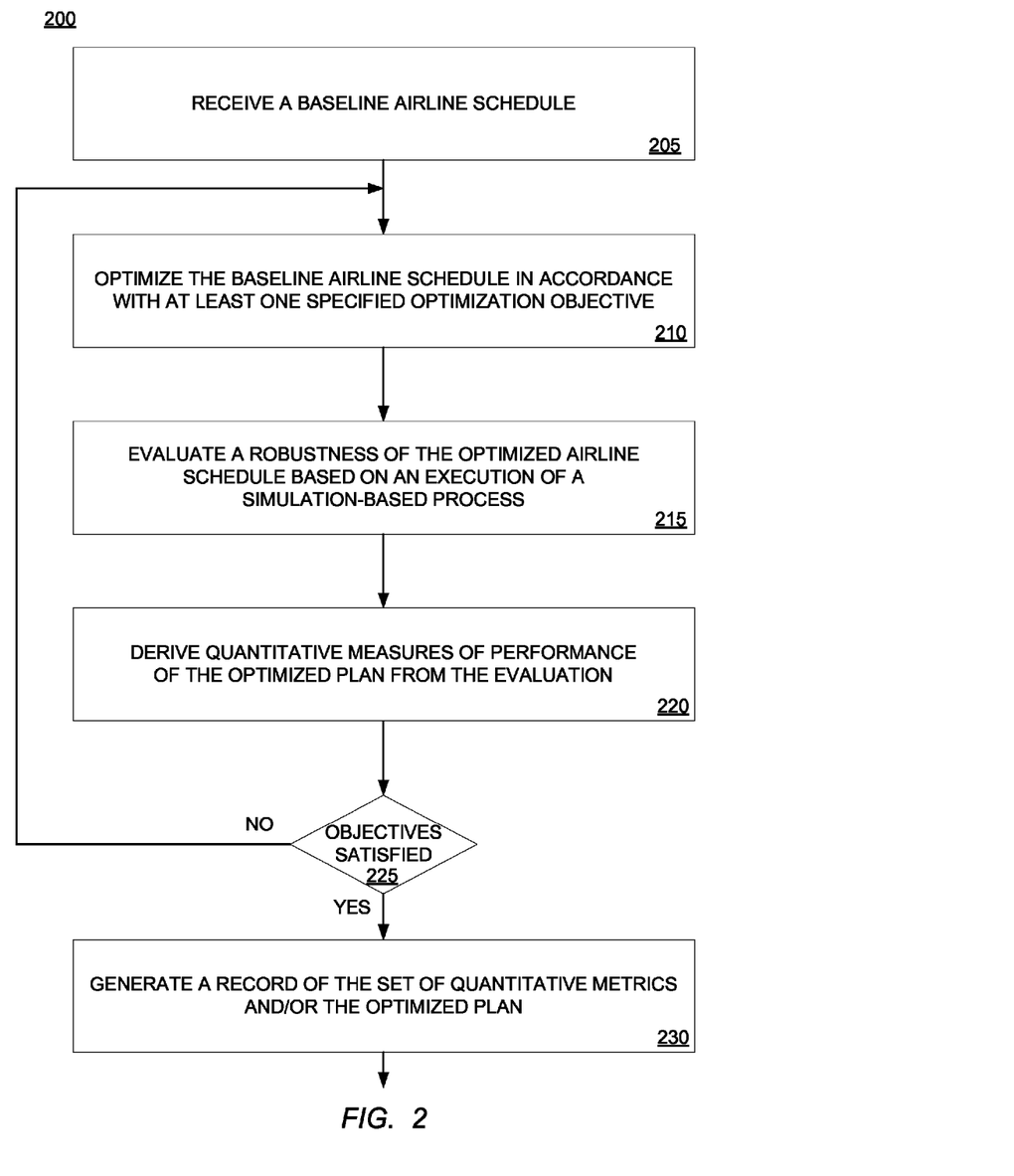
FIG. 2 is a depiction of a flow diagram, according to some embodiments.

In some aspects, system 100 and the process(es) performed thereby may be used to optimize an airline scheduling plan and evaluate the robustness of said optimized plan with regards to one or more optimization and robustness objectives and goals. FIG. 2 is an illustrative flow diagram depiction of a process that may be performed by a system, in accordance with some embodiments herein. In some aspects, system 100 may be used to implement at least some of the operations of process 200 shown in FIG. 2. In part, some details related to process 200 have been presented hereinabove in the introduction and discussion of system 100. Accordingly, while a complete discussion of FIG. 2 will now be disclosed below, certain details that may be repetitive in nature may not be repeated since they are already disclosed herein.

Referring to FIG. 2, a process related to providing a platform or framework for robust network planning optimization for commercial airline flight operations is disclosed. Process 200 may be implemented by a system, application, or apparatus configured to execute the operations of the process. In general, flow 200 relates to a process to efficiently (1) optimize an airline schedule or plan and (2) evaluate the robustness of the optimized plan, where the evaluation is a quantitative evaluation. In some embodiments, various hardware elements of an apparatus, device or system embodying system 100 executes program instructions to perform process 200. As an example, an airline schedule planner may want to execute a revenue plan decided by the airline company with minimal asset costs and, at the same time, preserve or exceed the current level of operation performance. Per this example, the revenue plan is the requirement of traffic frequency among all city pairs, the assets (or resources) are aircraft, crew, and other resources of the airline, and the key metrics of operation performance may be the on-time arrival rate and flight cancellation rate, on-time departure, on-time arrival, flight delays, flight cancellations, passenger satisfaction, cargo, revenue, and cost., where operation performance may also be affected by the opportunity of recovery in the schedule when disturbances occur. This example use-case may seek to answer questions regarding: (1) how to design a flight plan that covers all the required traffic frequency and requires the minimal number of aircrafts; (2) how to design the routes for the aircrafts so that the on-time arrival rates will be maintained at (or exceed) the baseline level; and (3) how to allow sufficient recovery opportunities (such as aircraft swaps and/or crew swaps) in the flight plan.

In some embodiments, hard-wired circuitry may be used in place of, or in combination with, program instructions for implementation of processes according to some embodiments. Program instructions that can be executed by a system, device, or apparatus to implement process 200 (and other processes and sub-processes disclosed herein) may be stored on or otherwise embodied as non-transitory, tangible media. Embodiments are therefore not limited to any specific combination of hardware and software.

Prior to operation 205, applications or services executing on a device or system (not shown) such as, for example, a server-side computing device (e.g., an application server) of a distributed database system may be developed and deployed to develop, manage, and persist an airline schedule or plan. Process 200 may receive an airline schedule from the device or system.

At operation 205, a baseline airline schedule is received. The schedule may be received from a communication interface or device that may be integral to or separate from a device or system implementing process 200. In some aspects, the baseline schedule may be a newly proposed airline schedule or plan developed a number of months ahead of any planned use of the plan or plans derived therefrom.

At operation 210, the plan received at operation 205 is transmitted to an optimization module (e.g., 105) to optimize the plan based on one or more specified objectives. The desired objectives of the optimization module may be specified by a user (e.g., an airline schedule planning administrator, etc.) or other authorized entity in advance of or as part of operation 205.

At operation 215, a robustness of the airline schedule optimized at operation 210 may be provided as an input to a robustness evaluation model (e.g., module 110). In some embodiments, a simulation-based method or process is used to evaluate the robustness of the optimized plan, wherein the evaluation considers disturbances to airline operations that occur or would occur near and/or during a flight operation.

Continuing with process 200, operation 220 includes a determination or calculation of quantitative measures or metrics of a performance of the optimized plan from the evaluation. In some aspects, the quantitative metrics may include one or more KPIs of factors deemed relevant and important indicators of an airline's performance. The KPIs may be determined based on a specification determined for a particular airline and/or operating scenario for the airline. In some embodiments, operation 220 may be accomplished by a robustness analysis module. The quantitative metrics of operation 220 may be compared to a predetermined threshold value (i.e., a performance reference value) at operation 225 to determine whether the optimized and evaluated plan satisfies the specified objectives and performance criteria of a user or other entity. In the instance the metrics (at least) meet the specified criteria, then process 230 may generate a report including the quantitative metrics and/or the optimized plan incorporating the robustness considerations.

Otherwise, in the instance the metrics do not meet or satisfy the specified performance criteria, then process 200 may proceed back to operation 210 to optimize the previously optimized plan with updated constraint(s) and/or objective function(s) and to evaluate the robustness of this newly optimized plan. In some aspects, one or more parameters considered in operation 210 may be tuned, updated, or otherwise informed by the feedback from operation 220 to potentially improve the performance of the plan currently being optimized and evaluated.

In some aspects, the robustness analysis module herein provides feedback to the optimization module, where, if another iteration is necessary, the feedback guides the tuning and updating of constraint(s) and objective function(s) of the optimization module. In some aspects, the disclosed system, method, and medium herein operate in an iterative manner, and the iterative process terminates when the predefined performance thresholds are satisfied by the generated schedule.

Figure 3:
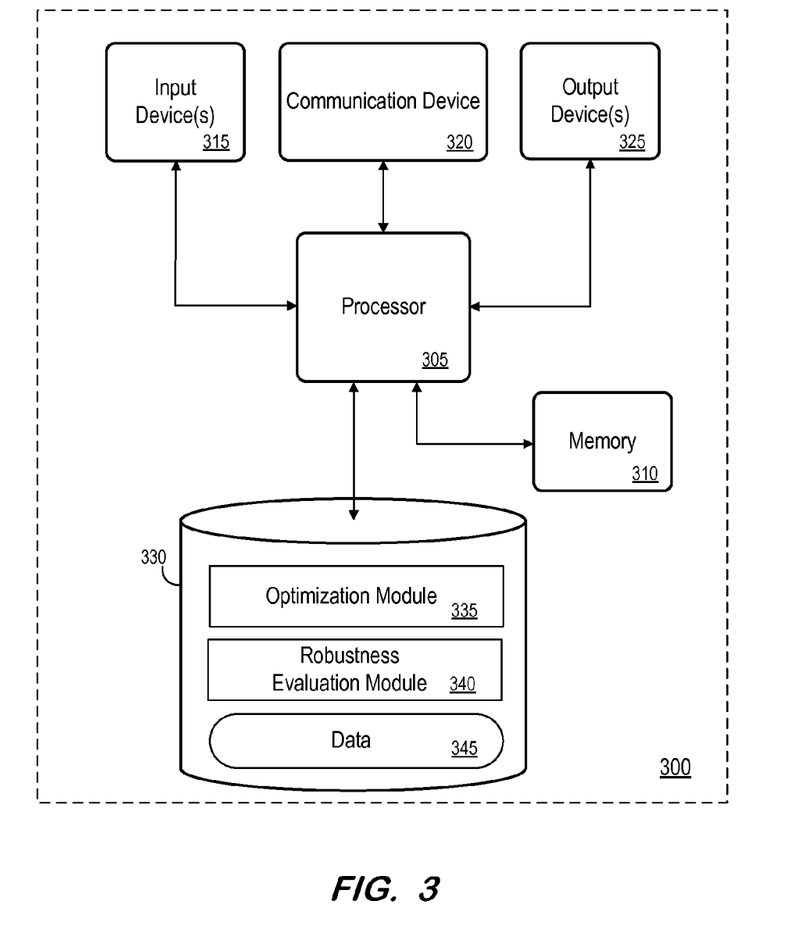
FIG. 3 is a block diagram of a robust network planning optimization processing tool or platform, according to some embodiments.

FIG. 3 is a block diagram of a computing device, in accordance with some embodiments. System 300 may be, for example, associated with devices for implementing the processes disclosed herein. System 300 comprises a processor 305, such as one or more commercially available Central Processing Units (CPUs) in the form of one-chip microprocessors or a multi-core processor, coupled to a communication device 320 configured to communicate via a communication network (not shown in FIG. 3) to another device or system (e.g., an administrator device or a client device, not shown). System 300 may also include a cache 310, such as RAM memory modules. The system may further include an input device 315 (e.g., a touchscreen, mouse and/or keyboard to enter content) and an output device 325 (e.g., a touchscreen, a computer monitor to display, a LCD display).

Processor 305 communicates with a storage device 330. Storage device 330 may comprise any appropriate information storage device, including combinations of magnetic storage devices (e.g., a hard disk drive), optical storage devices, solid state drives, and/or semiconductor memory devices. In some embodiments, storage device 330 may comprise a database system, including in some configurations an in-memory database.

Storage device 330 may store program code or instructions to control an operation of database engine 335 to optimize an airline schedule/plan and evaluate a robustness therein, in accordance with processes herein. Processor 305 may perform the instructions for implementing optimization module 335 and robustness evaluation module 340 to thereby operate in accordance with any of the embodiments described herein. Optimization module 335 and robustness evaluation module 340 may be stored in a compressed, uncompiled and/or encrypted format. Program instructions for optimization module 335 and robustness evaluation module 340 may furthermore include other program elements, such as an operating system, a database reporting system, and/or device drivers used by the processor 305 to interface with, for example, a client, an administrator, and peripheral devices (not shown in FIG. 3). Storage device 330 may also include data 340. Data 340 may be used by system 300, in some aspects, in performing one or more of the processes herein, including individual processes, individual operations of those processes, and combinations of the individual processes and the individual process operations. For example, data 340 may comprise a persistence layer of a database system and store optimization specified objectives, target KPIs, flight plans, etc., in accordance with some embodiments herein.

Figure 4:
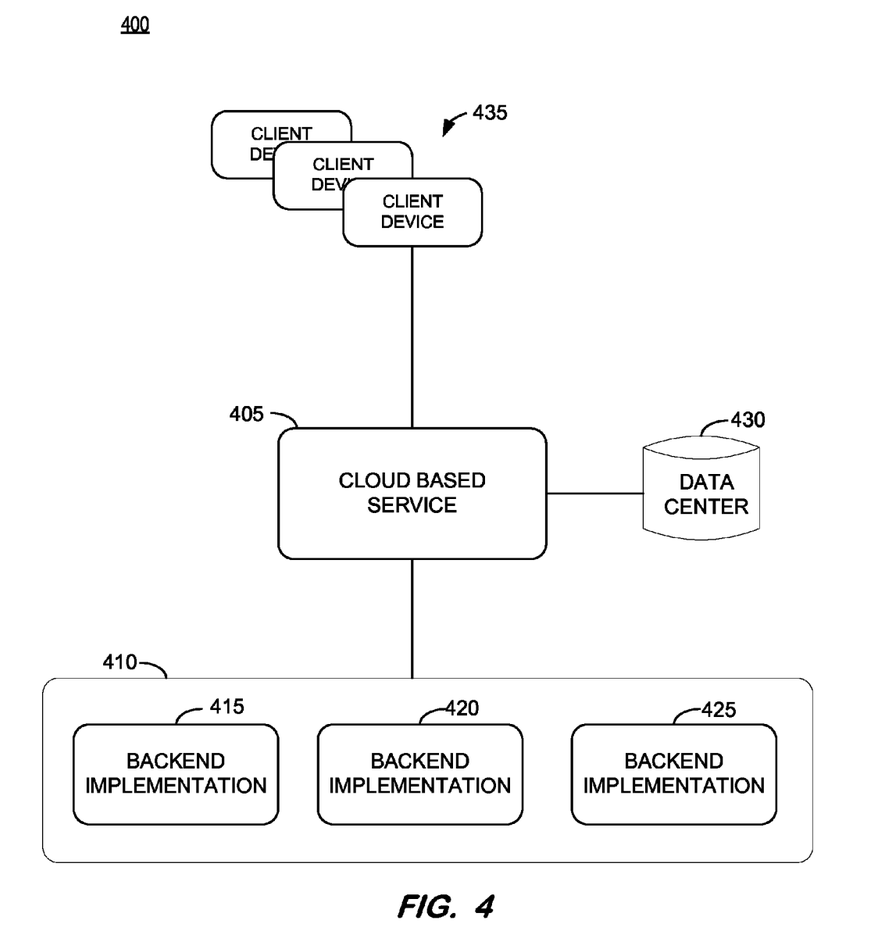
FIG. 4 is a logical block diagram of computing system or platform, according to some embodiments.

In some embodiments, the system can be operated in the "cloud", which allows geographically distributed users to operate the system, report/inject disturbance information, and obtain schedules. FIG. 4 is an illustrative depiction of a logical block diagram of a computing system or platform, in accordance with some embodiments. System 400 may be, for example, associated with devices for implementing the processes disclosed herein (e.g., process 200). Being a logical representation or an abstraction of a device, system, or platform, an actual implementation of system 400 is not limited to the specific configuration depicted in FIG. 4 and may include fewer, additional, alternative, and substitute components, arranged in varying configurations. For example, one or more devices and systems to facilitate communication and/or processing may be disposed between two or more components of FIG. 4, without loss of any generality within the scope herein.

System 400 includes a cloud based service 405. Cloud based service 405 may be provided by a service provider 410. Service 405 may be, without limit or loss of generality, a business service (e.g., a platform or framework for robust network planning optimization for commercial airline flight operations is disclosed, etc.), a cloud-based application, and other applications and services. In some embodiments, service provider 410 may employ an instance of a database system in the implementation of backend systems 415, 420, and 425. Backend implementations 415, 420, and 425 may operate alone or in combination to deliver one or more services and applications 405 to client devices 435. The processes and concepts disclosed herein are not limited to any one system or technical implementation thereof.

In some embodiments, client devices (or simply clients) 435, service provider 410, and a data center 430 supporting the operation and availability of cloud based service 405 may be distributed throughout different locations remote from each other. For example, a client 435 located in a first city (e.g., New York) may request cloud based service 405 as provided by a service provider 410 located in a second city (e.g., Boston), where data center 430 may be embodied in a data center. In order to deliver the desired service to the client, a number of communication and data calls may typically be made to, for example, backend implementation 425 and data center 430.

In some embodiments, processes, mediums, and systems herein may operate to provide a robust network planning optimization service in a manner that enhances, for example, a business planning service and a machine or device providing such as service. All systems and processes discussed herein may be embodied in program code stored on one or more tangible, non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

In some embodiments, aspects herein may be implemented by an application, device, or system to manage recovery of an entity or other application in a consistent manner across different devices, effectively across an entire domain.

As used herein, information may be "received" by or "transmitted" to, for example: (i) the platform 100 from another device; or (ii) a software application or module within the platform 100 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the figures illustrate aspects of the architecture, functionality, and operation of possible implementations of systems, methods and computer program products, according to various embodiments of the present invention. In this regard, each block in the flowchart or block diagrams may represent a module, segment, or portion of code, which comprises one or more executable instructions for implementing the specified logical function(s). In some alternative implementations, the functions noted in a particular block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. Further, a computer program product can include a computer-readable storage medium with code adapted to be implemented to carry out one or more method steps described herein, including the provision of the system with the distinct software modules.

Although embodiments have been described with respect to certain contexts, some embodiments may be associated with other types of devices, systems, and configurations, either in part or whole, without any loss of generality.

The embodiments described herein are solely for the purpose of illustration. Those in the art will recognize other embodiments which may be practiced with modifications and alterations. Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A system comprising:
    a communication device operative to receive a baseline airline schedule including details associated with at least one flight;
    an optimization module to receive the baseline airline schedule from the communication device and optimize the baseline airline schedule;
    a robustness analysis module to receive the optimized airline schedule and evaluate the robustness thereof:
    a memory to store program instructions; and
    at least one processor coupled to the memory and in communication with the optimization module and the robustness analysis module, the at least one processor being operative to execute program instructions to:
    optimize, by the optimization module, the baseline airline schedule in accordance with at least one specified optimization objective to generate an optimized airline schedule;
    evaluate, by the robustness analysis module, a robustness of the optimized airline schedule based on an execution of a simulation based process to generate a set of quantitative metrics, wherein the robustness of the optimized airline schedule comprises a capacity of the optimized airline schedule to absorb airline operational disturbances without deviating from its schedule; and
    output a record of the set of quantitative metrics;
    wherein the set of quantitative metrics includes a set of robustness key performance indices (KPIs) and wherein output of the robustness analysis module is fed back to the optimization module when the evaluated robustness does not equal a desired, threshold value for the KPIs for updating optimization module parameters to generate a new optimized schedule.

2. The system of claim 1, wherein the robustness analysis module further:
    determines whether the evaluated robustness of the optimized airline schedule satisfies a predetermined threshold robustness value;

in an instance the evaluated robustness of the optimized airline schedule satisfies the predetermined threshold robustness value, proceeds to generate the record of the set of quantitative metrics; and in an instance the evaluated robustness of the optimized airline schedule does not satisfy the predetermined threshold robustness value, uses the generated set of quantitative metrics to further optimize and evaluate the robustness of the optimized airline schedule based on updated parameter settings.

3. The system of claim 1, wherein the details associated with the at least one flight include at least one of a flight number, a flight departure time, a flight arrival time, a flight departure airport, a flight arrival airport, an aircraft type for the at least one flight, flight crew details for the at least one flight, desired city pairs, desired flight times, block times, aircraft assets, airports, airport, gate assignments, ground crews, flight crews, and combinations thereof.

4. The system of claim 1, wherein the optimization module executes the optimization using at least one algorithm from a suite of algorithms, the suite of algorithms including at least one of a connection-based algorithm, a string-based algorithm, an artificial intelligence algorithm, a heuristics-based algorithm and a particular optimization algorithm executed depends on a user specification, a complexity of the optimization, and a combination thereof.

5. The system of claim 1, wherein the robustness analysis module that executes the simulation based process to generate the set of quantitative metrics considers, at least in part, at least one of identified root causes of airline operation disturbances, user-defined disturbances, and hypothetical disturbances.

6. A method implemented by a computing system in response to execution of program instructions by a processor of the computing system, the method comprising:

receiving a baseline airline schedule including details associated with at least one flight;

optimizing the baseline airline schedule in accordance with at least one specified optimization objective to generate an optimized airline schedule;

evaluating a robustness of the optimized airline schedule based on an execution of a simulation based process to generate a set of quantitative metrics, wherein the robustness of the optimized airline schedule comprises a capacity of the optimized airline schedule to absorb airline operational disturbances without deviating from its schedule; and outputting a record of the set of quantitative metrics;

wherein the set of quantitative metrics includes a set of robustness key performance indices (KPIs) and wherein output of the robustness analysis module is fed back to the optimization module when the evaluated robustness does not equal a desired, threshold value for the KPIs for updating optimization module parameters to generate a new optimized schedule.

7. The method of claim 6, further comprising:

determining whether the evaluated robustness of the optimized airline schedule satisfies a predetermined threshold robustness value;

in an instance the evaluated robustness of the optimized airline schedule satisfies the predetermined threshold robustness value, proceeding to generate the record of the set of quantitative metrics; and in an instance the evaluated robustness of the optimized airline schedule does riot satisfy the predetermined threshold robustness value, using the generated set of quantitative metrics to further optimize and evaluate the robustness of the optimized airline schedule based on updated parameter settings.

8. The method of claim 6, wherein the details associated with the at least one flight include at least one of a flight number, a flight departure time, a flight arrival time, a flight departure airport, a flight arrival airport, an aircraft type for the at least one flight, flight crew details for the at least one flight, Previously presented to desired city pairs, desired flight times, block times, aircraft assets, airports, airport gate assignments, ground crews, flight crews, and combinations thereof.

9. The method of claim 6, wherein the optimization is performed using at least one algorithm from a suite of algorithms, the suite of algorithms including at least one of a connection-based algorithm, a string-based algorithm, an artificial intelligence algorithm, a heuristics-based algorithm and a particular optimization algorithm used depends on a user specification, a complexity of the optimization, and a combination thereof.

10. The method of claim 6, wherein the simulation based process to generate the set of quantitative metrics considers, at least in part, at least one of identified root causes of airline operation disturbances, user-defined disturbances, and hypothetical disturbances identified.

11. A non-transitory, computer-readable medium storing instructions that, when executed by a computer processor, cause the computer processor to perform a method associated with a robust network planning optimization, the medium comprising program instructions executable by the computer processor to:

receive a baseline airline schedule including details associated with at least one flight;

optimize the baseline airline schedule in accordance with at least one specified optimization objective or constraint to generate an optimized airline schedule;

evaluate a robustness of the optimized airline schedule based on an execution of a simulation based process to generate a set of quantitative metrics, wherein the robustness of the optimized airline schedule comprises a capacity of the optimized airline schedule to absorb airline operational disturbances without deviating from its schedule; and output a record of the set of quantitative metrics;

wherein the set of quantitative metrics includes a set of robustness key performance indices (KPIs) and wherein output of the robustness analysis module is fed back to the optimization module when the evaluated robustness does not equal a desired, threshold value for the KPIs for updating optimization module parameters to generate a new optimized schedule.

12. The medium of claim 11, further comprising program instructions executable by the computer processor to:

determine whether the evaluated robustness of the optimized airline schedule satisfies a predetermined threshold robustness value;

in an instance the evaluated robustness of the optimized airline schedule satisfies the predetermined threshold robustness value, proceed to generate the record of the set of quantitative metrics; and in an instance the evaluated robustness of the optimized airline schedule does not satisfy the predetermined threshold robustness value, use the generated set of quantitative metrics to further optimize and evaluate the robustness of the optimized airline schedule based on updated parameter settings.

13. The medium of claim 11, wherein the details associated with the at least one flight include at least one of a flight number, a flight departure time, a flight arrival time, a flight departure airport, a flight arrival airport, an aircraft type for the at least one flight, flight crew details for the at least one flight, desired city pairs, desired flight times, block times, aircraft assets, airports, airport gate assignments, ground crews, flight crews, and combinations thereof.

14. The medium of claim 11, wherein the optimization is performed using at, least one algorithm front a suite of algorithms, the suite of algorithms including at least one of a connection-based algorithm, a string-based algorithm, an artificial intelligence algorithm, a heuristics-based algorithm and a particular optimization algorithm used depends on a user specification, a complexity of the optimization, and a combination thereof.

15. The medium of claim 13, wherein the simulation based process to generate the set of quantitative metrics considers, at least in part, at least one of identified root causes of airline operation disturbances, user-defined disturbances, and hypothetical disturbances.

16. The system of claim 1, wherein the at least one specified optimization objective is based on at least one of a traffic intensity, a traffic pattern, an aircraft turn time, an airport flow rate, and a recovery opportunity.

17. The system of claim 16, wherein the recovery opportunity is characterized by a duration of aircraft turn, a time of day of aircraft turn, and a location of aircraft turn when the optimization objective is the recovery opportunity.

18. The system of claim 1, wherein airline operation disturbances are injected into the simulation based process to evaluate the robustness of the optimized airline schedule, wherein the airline operation disturbances include root causes and propagation delay causes.

19. The system of claim 1, wherein the simulation based process includes a modeling of a virtual airline.

* * * * *